Jan. 24, 1961 S. BEADLE ET AL 2,968,971
MOUNTING ARRANGEMENTS FOR GEAR TRAINS
Filed Aug. 31, 1959 2 Sheets-Sheet 1
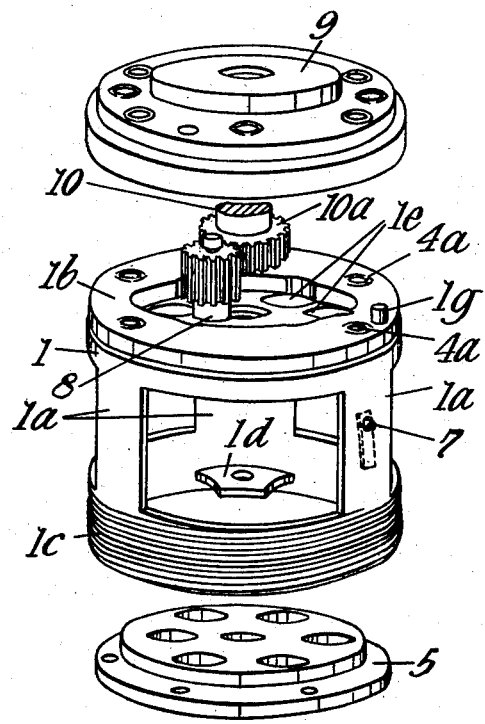
Fig.1.
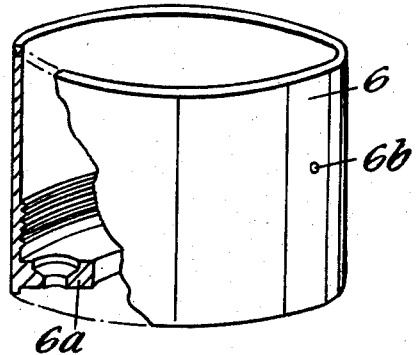

United States Patent Office 2,968,971
Patented Jan. 24, 1961

2,968,971

MOUNTING ARRANGEMENTS FOR GEAR TRAINS

Stanley Beadle and Ainger Alexander Gee, Beckenham, England, assignors to Muirhead & Co. Limited, Beckenham, England Filed Aug. 31, 1959, Ser. No. 836,991

Claims priority, application Great Britain Oct. 6, 1958

5 Claims. (Cl. 74—606)

This invention relates to a mounting arrangement for gear trains.

Conventional mounting arrangements comprise a pair of parallel plates spaced apart by means of separate pillars.

The rigidity of such a mounting is not entirely satisfactory in certain applications and also the pillars reduce the space available for the gear wheels unless they are partially cut away which, however, reduces the rigidity still further.

Lack of rigidity may result in an increase of backlash in the gears as well as having other undesirable effects. In some applications backlash may be particularly undesirable, e.g. synchro reduction drives where a blacklash of 45 minutes of arc is specified as a maximum.

The present invention consists of a mounting arrangement for a gear train having a gear case structure comprising one end plate, a ring for supporting the second end plate and webs spacing these apart all formed integrally from a single piece of material.

Conveniently, this structure is machined from the solid block.

Conveniently, also, the second end plate drops into the ring as a close fit and is located axially by circumferentially spaced internal projections on the ring and circumferentially by a dowel pin.

The ring may be formed with an external thread and a cup-shaped housing, internally threaded, screws over the gear casing structure as a close fit over the webs and integral end plate.

An end cover may be screwed over the integral end plate with the output gear wheel in between and supported by ball bearings in the end plate and the end cover.

The invention will be further described with reference to the accompanying drawings.

Figure 1 is an exploded view of an embodiment of the invention.

Figure 2:
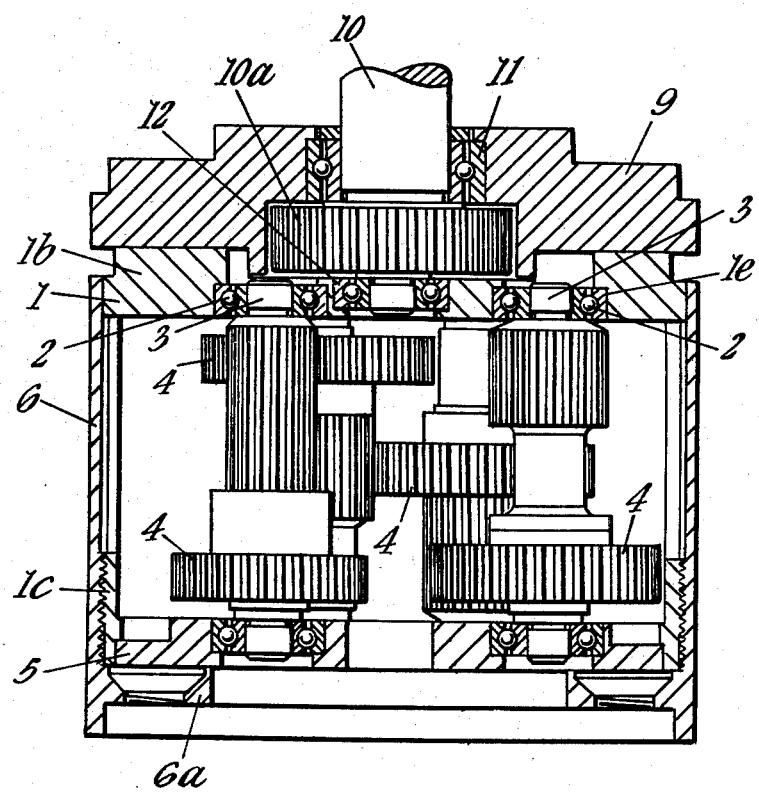
Figure 2 is a section through the central axis of the embodiment.

In the drawing, the gear case 1 is machined first as a cup shape from a cylindrical block. A milling operation leaves the three webs 1a between the end plate 1b and the ring 1c. An internal ridge on the latter is milled away to leave three internal projections 1d and the ring is externally threaded.

The end plate 1b is drilled at positions 1e for the insertion of ball bearing races 2 to receive the ends of the gear shaft 3 of the gear wheels 4 and provided with threaded apertures 4a and a dowel pin 1g for a purpose to be described.

The other end plate 5 is drilled to receive ball bearings 2 to receive the other ends of the gear shafts 3 and is inserted into the ring 1c and against the abutments 1d to retain the gear shafts in position, being located by means of a dowel pin and secured to the abutments by screws.

The centrally disposed hole in end plate 5 allows the input shaft of the prime mover, e. g., a synchro, formed with a driving pinion, to be inserted in the gear case so that the driving pinion engages with the first gear wheel of the gear train.

The housing or casing 6 is of cup-shape, internally threaded and screws over the threaded ring 1c enclosing the gears. The base 6a of the cup has a central aperture and is drilled and countersunk to receive fixing screws inserted from the inside for attachment e. g. to a synchro.

The housing 6 is formed with a small hole 6b and in the screwed on position this comes opposite a spring-loaded pin 7 passing through one of the webs 1a so that the housing is locked against accidental release.

The final drive gear shaft 8 of the gear train passes through an aperture in the end plate 1b and is supported at its end in a ball bearing inserted in an end cover 9.

Centrally mounted in the end cover 9 is the output drive shaft 10 which is formed with a gear wheel 10a engaging with the gear wheel on shaft 8.

Shaft 10 is supported in a ball bearing 11 in the end cover 9 and in a ball bearing 12 in the end plate 1b.

The end cover 9 is located on the end plate 1b by the dowel pin 1g and secured by circumferentially spaced screws.

The actual arrangement of the gears within the gear case can be varied to cover gear ratios from, say 1:15 to 1:600.

Using a 1:300 gear train on an extended test the backlash at the end of the run was 40 minutes of arc.

The arrangement thus provides a rigid support for the gears which is easy to assemble while permitting of large gear wheels and hence high ratio gear trains and being of relatively short length.

Various modifications may be made within the scope of the invention.

We claim:

1. A gear assembly comprising an integral gear case structure of an end plate, a ring and webs spacing the end plate and ring apart, a second end plate located axially and circumferentially in the ring of the gear case structure, gear shafts having gear wheels thereon, bearings locating each of the gear shafts at spaced positions in the end plate of the gear case structure and in the second end plate respectively, and a cylindrical housing fitting closely around the gear case structure and secured thereto.

2. A gear assembly as claimed in claim 1, in which the housing is formed with an inwardly projecting ring drilled and countersunk to receive fixing screws for attachment of the gear assembly to another part.

3. A gear assembly as claimed in claim 1 comprising an end cover attached to the integral end plate, an output gear wheel located between the end cover and integral end plate and bearings for the output gear wheel in the end cover and integral end plate.

4. A gear assembly as claimed in claim 1 in which the ring is formed with an external thread and the housing is internally threaded to screw thereon.

5. An arrangement as claimed in claim 4, comprising a spring-loaded pin mounted to pass through one of the webs and engage a hole in the housing in the fully screwed-on position.

References Cited in the file of this patent

UNITED STATES PATENTS

| | | |
|---|---|---|
| 2,062,103 | Perry | Nov. 24, 1936 |
| 2,883,880 | Merkle | Apr. 28, 1959 |
| 2,892,357 | Bachman | June 3, 1959 |
| 2,908,180 | Swenson | Oct. 13, 1959 |

FOREIGN PATENTS

| | | |
|---|---|---|
| 1,154,615 | France | Apr. 14, 1958 |